United States Patent [19]

Adelmann

[11] Patent Number: 4,591,326

[45] Date of Patent: May 27, 1986

[54] PRESSING DEVICE FOR PRODUCING COMPACTS FROM SOURCE MATERIAL IN POWDER FORM, IN PARTICULAR PULVERIZED NUCLEAR REACTOR FUEL

[75] Inventor: Manfred Adelmann, Bruchköbel, Fed. Rep. of Germany

[73] Assignee: ALKEM GmbH, Hanau, Fed. Rep. of Germany

[21] Appl. No.: 696,457

[22] Filed: Jan. 31, 1985

[30] Foreign Application Priority Data

Feb. 13, 1984 [DE] Fed. Rep. of Germany ....... 3405084

[51] Int. Cl.[4] ........................ B30B 15/30; B29C 3/04; B29C 3/06

[52] U.S. Cl. .................................... 425/256; 425/447; 425/147

[58] Field of Search ........................ 425/147, 256, 447

[56] References Cited

U.S. PATENT DOCUMENTS 4,443,174 4/1984 Heller et al. ........................ 425/147

*Primary Examiner*—J. Howard Flint, Jr.

*Attorney, Agent, or Firm*—Herbert L. Lerner; Laurence A. Greenberg

[57] ABSTRACT

A pressing device for producing compacts from source material in powder form in a die-plate bore with a filling shoe and a feed tube with feedscrew as metering means of a reservoir for the source material powder wherein in the transport path for the source material powder, between the end of the feed tube and an outflow opening of the filling shoe, is a passing sieve with associated passing element for removing agglomerates in the source material powder.

3 Claims, 4 Drawing Figures

PRESSING DEVICE FOR PRODUCING COMPACTS FROM SOURCE MATERIAL IN POWDER FORM, IN PARTICULAR PULVERIZED NUCLEAR REACTOR FUEL

BACKGROUND OF THE INVENTION

1. Field of the Invention

The invention relates to a pressing device for producing compacts from source material in powder form, in particular pulverized nuclear reactor fuel. The device has a die-plate contained in a platen and a bore associated with a ram for receiving source material powder, and also has a filling shoe disposed on a movable arm and bearing on and displaceable over the platen for filling source material powder into the die-plate bore. The filling shoe has an outflow opening directed toward the platen with a passing wheel as filling aid means, and is connected by a hose to a metering means with coaxial feed tube of a reservoir for source material powder.

2. Description of the Prior Art

U.S. Pat. No. 4,443,174 (German Pat. No. 31 39 150) discloses such a pressing device. This known pressing device shows no dust formation and avoids in particular powder losses, as there is no emergence of powder to the outside of the filling shoe. Such dust formation and powder losses could be especially disadvantageous in particular in the processing of pulverized nuclear reactor fuel such as $UO_2$ and $UO_2/PuO_2$ powder, as these pulverized nuclear reactor fuels are not only very expensive, but also toxic and radioactive. This is true in particular of plutonium-containing pulverized nuclear reactor fuels which, to avoid toxic and radioactive exposure for the operating personnel, are processed in principle in so-called glove boxes, the interior of which is closed off dustproof from the surroundings.

When setting up and operating the known pressing device in a glove box, therefore, considerable cleaning operations in this glove box are avoided, which cleaning operations would otherwise recur regularly and could lead to high radiation exposure of the operating personnel e.g. when processing plutonium-containing pulverized nuclear reactor fuels.

SUMMARY OF THE INVENTION

An object of the invention is to develop the known pressing device and to avoid the filling, into the die-plate bore, of source material powder which is at least in part agglomerated on the transport path from the reservoir.

With the foregoing and other objects in view, there is provided in accordance with the invention a pressing device for producing compacts from source material in powder form in particular pulverized nuclear reactor fuel, comprising a die-plate contained in a platen and having a bore associated with a ram for receiving source material powder, a filling shoe disposed on a movable arm and bearing on and displaceable over the platen for filling source material powder into the die-plate bore, an outflow opening in the filling shoe directed toward the platen with a passing wheel as filling aid means, a hose connecting the outflow opening of the filling shoe to a metering means with coaxial feed tube of a reservoir for source material powder, the combination therewith of a passing sieve for the source material powder with an associated passing element for passing the source material powder through the passing sieve by a relative movement between passing sieve and passing element arranged in the transport path for the source material powder, between the end of the feed tube of the reservoir and the outflow opening of the filling shoe.

Other features which are considered as characteristic for the invention are set forth in the appended claims.

Although the invention is illustrated and described herein as embodied in pressing device for producing compacts from source material in powder form, in particular pulverized nuclear reactor fuel, it is nevertheless not intended to be limited to the details shown, since various modifications may be made therein without departing from the spirit of the invention and within the scope and range of equivalents of the claims.

BRIEF DESCRIPTION OF THE DRAWINGS

The construction and method of operation of the invention, however, together with additional objects and advantages thereof will be best understood from the following description of specific embodiments when read in connection with the accompanying drawing, in which.

DETAILED DESCRIPTION OF THE INVENTION

Figure 1:
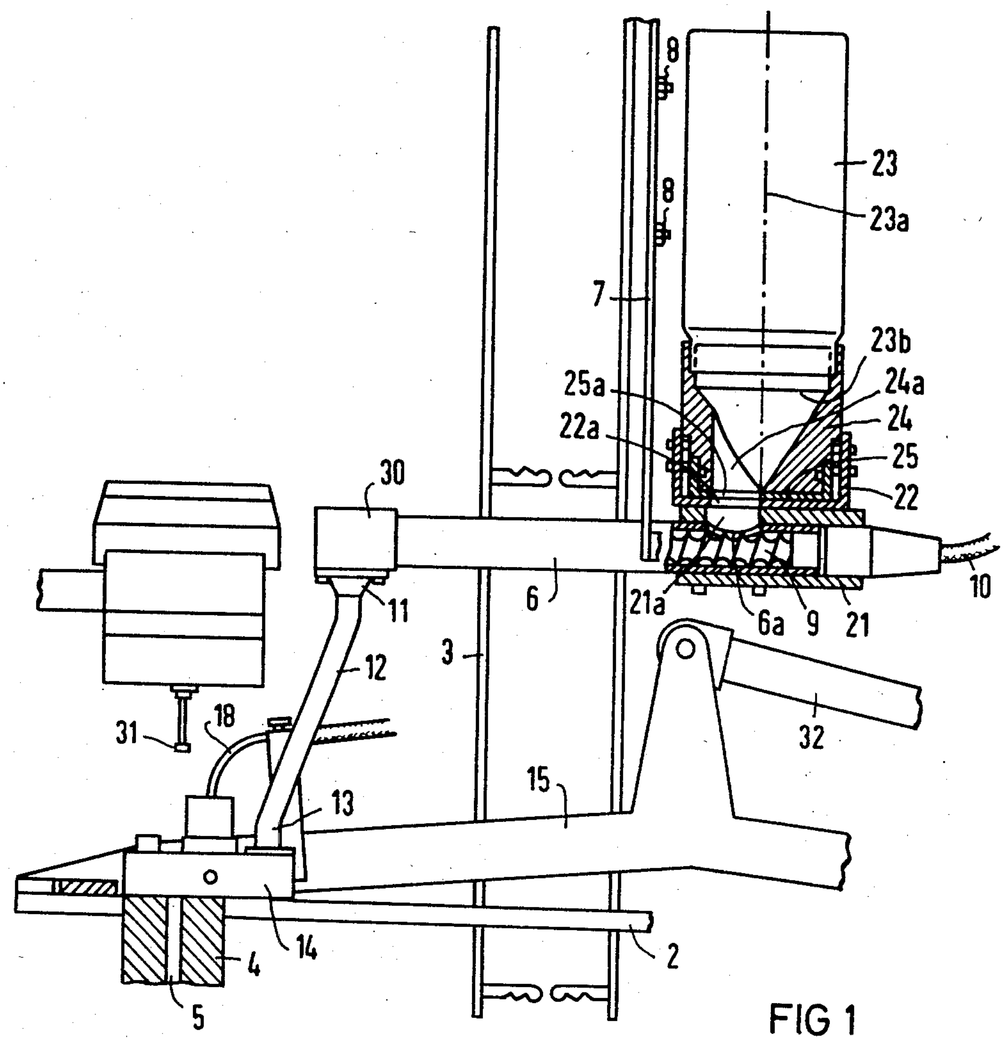
FIG. 1 shows a detail from a pressing device according to the invention with separate parts partially sectioned in longitudinal direction.

A pressing device of the kind initially mentioned is characterized, according to the invention, in that there is arranged in the transport path for the source material powder, between the end of the feed tube and the outflow opening of the filling shoe, a passing sieve for the source material powder with associated passing element for passing the source material powder through the passing sieve by a relative movement between the passing sieve and passing element.

In this manner, $PuO_2$ agglomerates which have a diameter greater than 0.5 mm and may occur e.g. in a $UO_2/PuO_2$ powder mixture can be destroyed just before the filling of the powder mixture into the die-plate bore of the pressing device and hence just before the pressing of this filled powder mixture into compacts. It is from such $PuO_2$ agglomerates in the compact, when the latter is being sintered, islands of increased plutonium concentration will form in the produced sintered body which later may constitute points of increased heat developed in the nuclear reactor and cause damage to the fuel element rod jacket tube into which the sintered body is filled.

The probability for the filling of agglomerates into the die-plate bore is especially slight if the passing wheel has two spaced vane rims mounted on the same shaft, and the passing sieve is arranged between these two vane rims and retained at the filling shoe.

It is further structurally very favorable if the passing sieve is shaped as a sleeve and at the end of the feedscrew with longitudinal axis parallel to the axis of rotation thereof a lateral outlet opening is converingly arranged at the feedscrew for the source material powder, and if the passing element is mounted as passing wheel on the end of the feedscrew and has a vane and/or bristle rim.

The invention and its advantages will be explained in an embodiment with reference to the drawings.

The pressing device according to FIGS. 1 to 4 comprises a platen 2 and a stand 3. The platen 2 contains a die-plate 4 having a bore 5 open at the top and perpendicular to the platen 2.

A horizontal feed tube 6 is mounted on stand 3 through a frame 7 attached by screws 8. Feed tube 6 contains a coaxial feedscrew 9, which together with tube 6 forms a metering means. One end of the feedscrew 9 is connected to a flexible shaft 10, which is coupled with the shaft of an electric motor, not shown.

At the other end the transport tube 6 is a shoulder part 30, into which the interior of the feed tube 6 opens and from which shoulder a vertical, downwardly directed funnel type connecting piece 11 extends. One end of a deformable hose 12 of polyvinyl chloride is fitted on the connecting piece 11. The other end of hose 12 is fitted on a nipple 13 of a filling shoe 14.

The filling shoe 14 bears on the platen 2 and is disposed on a two-part arm 15, by means of which it can be moved over the platen 2 shown in FIG. 1 from right to left and from left to right, i.e. forward and back.

The filling shoe 14 has an inner space with an outflow opening 20 directed toward the platen 2. The nipple 13 of the filling shoe 14 opens into this inner space. A passing wheel 16 as passing element is arranged in the outflow opening 20, with wheel 16 having an axis of rotation which forms an angle of 90° with the plane defined by the outflow opening 20. The passing wheel 16 is rotatably mounted in a bearing body 35 which is inside the filling shoe 14 and is screwed to the filling shoe 14. The bearing body 35 may advantageously be at the same time an electric capacitor electrode and form with the platen 2 as counter-electrode a capacitive filling level measuring means for determining the filling level of the powder in the filling shoe 14, which powder level should desirably be always of equal height. This capacitive level measuring means may be connected as measuring sensor with a governor not shown, by which the speed of rotation of the electric motor, not shown, coupled with the flexible shaft 10 of the feedscrew 9, is regulated.

Mounted on the shaft of the passing wheel 16 are two mutually offset vane rims 36 and 37 spaced from each other. Between these vane rims 36 and 37 a flat passing sieve 38 with a mesh width of e.g. 310 $\mu m$ is arranged, which completely covers the outflow opening 20 and which is retained at the filling shoe 14 by a holding ring 39 screwed to the underside of the filling shoe 14.

The outflow opening 20 is surrounded by an annular felt packing 17 embedded in the holding ring 39. The passing wheel 16 is connected to a flexible shaft 18 which is coupled with the shaft of an electric motor not shown.

In the shoulder part 30 is a lateral downward outlet opening 40 for source material powder at the end of the feed tube 6. A passing sieve 41 in the form of a cylindrical sleeve with longitudinal axis parallel to the longitudinal axis of the feed tube 6 and with a mesh width of e.g. 310 $\mu m$ is also contained in the shoulder part 30. This passing sieve 41 completely covers the outlet opening 40.

A passing wheel 42 which has a cylindrical body is screwed onto the end of the feedscrew 9. The passing wheel 42 is contained in the passing sieve 41. Although this cylindrical body is coaxial with the feedscrew 9 and hence also with tube 6, its longitudinal axis is parallel to and spaced from the longitudinal axis of the passing sieve 41. The distance of the longitudinal axis of the cylindrical body from the passing sieve 41 is smallest above the outlet opening 40.

On the cylindrical body of the passing wheel 42, spaced from each other in axial direction, are mutually offset bristle rims 43. These bristles touch the passing sieve 41 only above the outlet opening 40 on the inner side of the passing sieve 41.

On the other end of the feed tube 6 with the flexible shaft 10 is mounted a sleeve 21, the cross-section of which has a rectangular contour. The wall of this sleeve 21 has on the top a lead-through **21*a*, which is aligned with a lead-through 6*a* in the wall of tube 6 leading to the feed spiral of feedscrew 9. A base portion 22 of a reservoir for source material powder with a can type place-on part 23 belonging to the reservoir is seated on the outside of sleeve 21, at the top. In the bottom of the base part 22, eccentric to the longitudinal axis 23*a* of the place-on part 23, is an outflow bore 22*a*, which is aligned with the lead-throughs 21*a* and 6*a* in the wall of tube 6**.

A hollow-cylindrical coupling part 24 is screwed to the place-on part 23 at the opening **23*b* of the can type place-on part 23. Coupling part 24 tapers internally in funnel form to a passage bore 24*a*, which is arranged eccentric to the longitudinal axis 23*a* of the can type place-on part 23 on the bottom of the coupling part 24**.

Between the coupling part 24 and the base part 22 is a pot type cover part 25 which has in its bottom a passage opening **25*a* eccentric to the longitudinal axis 23*a* of the can type place-on part 23**.

The cover part 25 closes the passage bore **24*a* in coupling part 24 as long as the can type place-on part 23 is not placed on the base part 22**.

By appropriate guiding and locking means, such as punctures, axially extending grooves and associated pins at the base part 22, at the cover part 25 and at the coupling part 24, the can type place-on 23 can only be placed on the base part 22 in such a way that the outflow bore **22*a* in base part 22 is aligned with the passage opening 25*a* in the cover part 25. The locking means provides that the can type place-on part 23 with the coupling part 24 can be rotated about the longitudinal axis 23*a* of the can type place-on part 23 relative to the cover part 25 to the extent that the outflow bore 24*a* in a base part 24 is aligned with the passage opening 25*a* and with the outflow bore 22*a* when the coupling part 24 with the cover part 25 is placed on the base part 22**.

Above the die-plate bore 5 in die-plate 4 in platen 2 there is indicated in FIG. 1 an upper ram 31 with which source material powder filled into the die-plate bore 5 is compacted to a compact.

Figure 2:
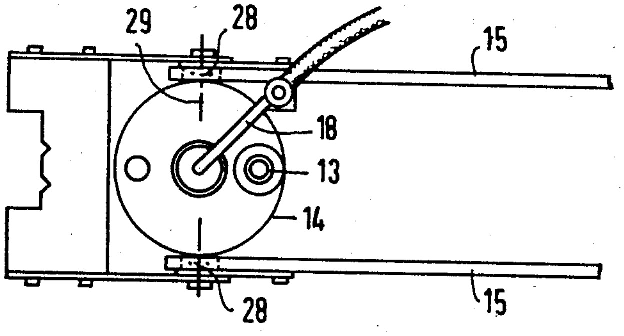
FIG. 2 shows a plan view of the filling head of the pressing device according to FIG. 1.
Figure 3:
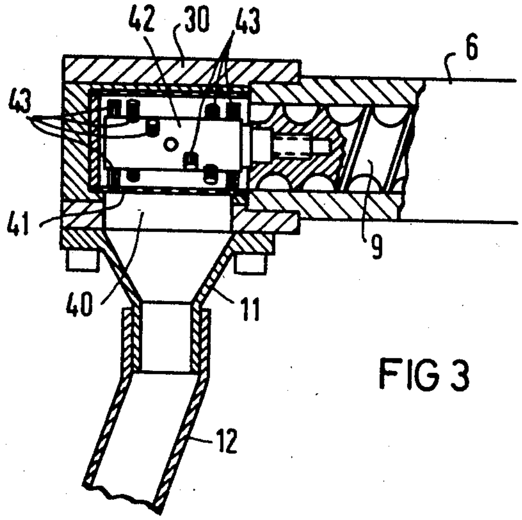
FIG. 3 shows a longitudinal section through an attachment part at the end of the pressing device according to FIG. 1.
Figure 4:
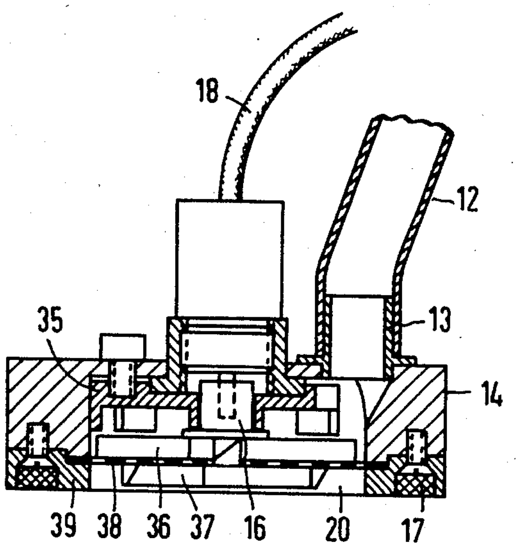
FIG. 4 shows a longitudinal section through the filling shoe of the pressing device according to FIG. 1.

To operate the pressing device according to FIG. 1 and FIG. 2, a can type place-on part 23, contained for example $UO_2/PuO_2$ powder, with an opening **23*b* directed vertically upward, is opened. Hereby the coupling part 24, on which the cover part 25 is located, is screwed tight at the opening 23*b*. The outflow bore 24*a* in the coupling part 24 is then closed by the cover part 25**.

Then the can type place-on part 23 with opening **23*b* directed vertically downward and with the coupling part 24 plus cover part 25 is placed on the base part 22, so that the passage opening 25*a* in cover part 25 is aligned with the outflow bore 22a in the base part 22. By rotation of the can type place-on part 23 with the coupling part 24 about the longitudinal axis 23a of the can type place-on part 23 relative to the cover part 25, the passage bore 24a in coupling part 24 is brought into alignment with the passage opening 25a in cover part 25. This causes the $UO_2/PuO_2$ powder to trickle without loss out of the can type place-on part 23 to the feedscrew 9 in tube 6, which conveys the power, also without loss, to the shoulder part 30**.

The powder is passed through, again loss-free and with elimination of agglomerates, by the passing wheel 42 and the passing sieve 41. The powder then trickles through hose 12 into the interior of the filling shoe 14 positioned above the die-plate bore 5. Thence it is passed, again with elimination of agglomerates, with the aid of the rotating passing wheel 16, through the passing sieve 38 into the die-plate bore 5.

Then the filling shoe 14 is pushed by arm 15 in FIG. 1 on platen 2 to the right, i.e. to the rear, so that the die-plate bore 5, filled to the upper brim with source material powder, is cleared. Thereafter the upper ram 31 is moved into the die-plate bore 5, and the powder contained in bore 5 is pressed against a lower ram not shown in FIG. 1, with formation of a compact. After return of the upper ram 31 to its starting position shown in FIG. 1, by a relative movement between die-plate 4 and the lower ram present in bore 5, the compact formed in bore 5 is ejected therefrom onto the platen 2, whence it is pushed into a magazine not shown by the filling shoe 14, which in FIG. 1 is again moved from right to left, i.e. from the rear forward, on platen 2. In the end position of this movement from right to left, i.e. from rear to front, the filling shoe 14 is again above the die-plate bore 5, which is again filled with $UO_2/PuO_2$ powder.

To avoid metallic abrasion, which might get into the starting material powder and possibly be a disturbance there, advantageously the feed tube 6 and the hose 12 consist of plastic, e.g. polyethylene, while the feedscrew 9 in tube 6 is made of special steel.

Also to avoid metallic abrasion, advantageously the housing of the filling shoe 14 is also made of plastic, preferably polyethelene.

The filling shoe 14 is pneumatically pressed against the platen 2 at constant pressure by a lever 32 articulated to arm 15. Thereby uniform wear of the felt packing 17 in filling shoe 14 is achieved without any manual readjustment of this packing 17. Advantageously, the filling shoe 14 is mounted for rotation at the movable arm 15 through ball bearings 28 about an axis of rotation 29 crosswise to its displacement direction on platen 2. The filling shoe 14 can thus better follow swinging movements of the platen 2, so that also during such swinging movements the felt packing 17 in the filling shoe 14 fits snugly against platen 2 and any losses of starting material in powder form passing through this packing 17 are avoided.

There are claimed:

1. Pressing device for producing compacts from source material in powder form in particular pulverized nuclear reactor fuel, comprising a die-plate contained in a platen and having a bore associated with a ram for receiving source material powder, a filling shoe disposed on a movable arm and bearing on and displaceable over the platen for filling source material powder into the die-plate bore, an outflow opening in the filling shoe directed toward the platen with a passing wheel as filling aid means, a hose connecting the outflow opening of the filling shoe to a metering means with coaxial feed tube of a reservoir for source material powder, the combination therewith of a passing sieve for the source material powder with an associated passing element for passing the source material powder through the passing sieve by a relative movement between passing sieve and passing element arranged in the transport path for the source material powder, between the end of the feed tube of the reservoir and the outflow opening of the filling shoe.

2. Pressing device according to claim 1, wherein the passing element is a passing wheel with two spaced vane rims mounted on the same shaft, with the passing sieve arranged between the two vane rims, and the passing sieve retained in the outflow opening in the filling shoe.

3. Pressing device according to claim 1, wherein the passing sieve is in the form of a sleeve at the end of the feedscrew with the longitudinal axis of the sleeve parallel to the axis of rotation of the feescrew, a lateral outlet opening covered by the sieve at the feed tube for the source material powder, and a passing wheel having a vane or bristle rim as a passing element mounted on the end of the feedscrew.

* * * * *